US009019661B2

(12) United States Patent
Rea et al.

(10) Patent No.: US 9,019,661 B2
(45) Date of Patent: Apr. 28, 2015

(54) APPARATUS WITH A PLURALITY OF HEAT SINKS

(71) Applicant: Seagate Technology LLC, Cupertino, CA (US)

(72) Inventors: Chris Rea, Edina, MN (US); Zoran Jandric, St. Louis Park, MN (US); Hua Zhou, Plymouth, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/961,644

(22) Filed: Aug. 7, 2013

(65) Prior Publication Data

US 2015/0043316 A1 Feb. 12, 2015

(51) Int. Cl.
G11B 5/127 (2006.01)
G11B 13/08 (2006.01)

(52) U.S. Cl.
CPC ..................................... G11B 13/08 (2013.01)

(58) Field of Classification Search
USPC ............... 360/125.32, 125.03, 125.3, 125.11, 360/125.15; 29/603.12, 603.13, 603.15, 29/603.16
See application file for complete search history.

(56) References Cited

U.S. PATENT DOCUMENTS

| 6,665,136 | B2 * | 12/2003 | Clinton et al. | 360/55 |
|---|---|---|---|---|
| 7,009,812 | B2 | 3/2006 | Hsu et al. | |
| 7,149,055 | B2 * | 12/2006 | Clinton et al. | 360/125.3 |
| 7,212,367 | B2 * | 5/2007 | Clinton et al. | 360/55 |
| 7,239,480 | B2 | 7/2007 | Hirabayashi et al. | |
| 7,869,165 | B2 * | 1/2011 | Miyauchi et al. | 360/319 |
| 8,077,417 | B2 * | 12/2011 | Mallary et al. | 360/51 |
| 8,259,413 | B2 | 9/2012 | Bonhote et al. | |
| 8,259,540 | B1 | 9/2012 | Sahoo et al. | |
| 8,451,555 | B2 | 5/2013 | Seigler et al. | |
| 8,451,696 | B2 | 5/2013 | Huang et al. | |
| 8,486,286 | B1 | 7/2013 | Gao et al. | |
| 8,493,693 | B1 * | 7/2013 | Zheng et al. | 360/324.11 |
| 8,582,253 | B1 * | 11/2013 | Zheng et al. | 360/324.2 |
| 8,670,215 | B2 | 3/2014 | Zou et al. | |
| 8,705,323 | B2 | 4/2014 | Contreras et al. | |
| 8,834,728 | B1 * | 9/2014 | Hu et al. | 216/22 |
| 2003/0043490 | A1 * | 3/2003 | Clinton et al. | 360/55 |

(Continued)

FOREIGN PATENT DOCUMENTS

EP 1398763 5/2006

OTHER PUBLICATIONS

Sep. 8, 2014, File History for U.S. Appl. No. 14/024,329 retrieved from U.S. Patent and Trademark Office Pair System on Sep. 8, 2014, 90 pages.

(Continued)

Primary Examiner — Allen T Cao
(74) Attorney, Agent, or Firm — Hollingsworth Davis, LLC

(57) ABSTRACT

An apparatus comprises a write transducer comprising a write pole having a tip portion proximate a media-facing surface and a return pole spaced apart from the write pole in a down-track direction. The apparatus further includes first and second heat sink portions. The first heat sink portion surrounds a first side of the tip portion that faces the return pole and extends outwards from the tip portion in a cross-track direction. The second heat sink portion comprises a first surface proximate the first heat sink portion and a second surface proximate the return pole and extends outwards in the cross-track direction further than the first heat sink portion.

20 Claims, 6 Drawing Sheets

(56) References Cited

U.S. PATENT DOCUMENTS

| | | | |
|---|---|---|---|
| 2004/0169950 A1* | 9/2004 | Clinton et al. | 360/55 |
| 2004/0240327 A1* | 12/2004 | Sendur et al. | 369/13.35 |
| 2005/0280935 A1* | 12/2005 | Clinton et al. | 360/125 |
| 2010/0149675 A1* | 6/2010 | Mallary et al. | 360/51 |
| 2010/0214685 A1* | 8/2010 | Seigler et al. | 360/59 |
| 2013/0107679 A1 | 5/2013 | Huang et al. | |
| 2013/0107680 A1* | 5/2013 | Contreras et al. | 369/13.32 |
| 2013/0176838 A1* | 7/2013 | Sendur et al. | 369/13.24 |
| 2014/0104724 A1* | 4/2014 | Shiroishi et al. | 360/75 |

OTHER PUBLICATIONS

U.S. Appl. No. 14/024,329.

\* cited by examiner

APPARATUS WITH A PLURALITY OF HEAT SINKS

SUMMARY

Embodiments of the disclosure are directed to approaches for increasing the contact area of a magnetic recording head. Some embodiments involve a write transducer, a first heat sink portion, and a second heat sink portion. The write transducer includes a write pole having a tip portion proximate a media-facing surface and a return pole spaced apart from the write pole in a downtrack direction. The first heat sink portion surrounds a first side of the write pole tip portion that faces the return pole and extends outwards from the tip portion in a cross-track direction. The second heat sink portion has a first surface proximate the first heat sink portion and a second surface proximate the return pole. The second heat sink portion extends outwards in the cross-track direction further than the first heat sink portion.

Some embodiments involve a write transducer, a first heat sink, and a second heat sink. The write transducer includes a write pole having a tip portion proximate a media-facing surface and a return pole spaced apart from the write pole in a downtrack direction. The first heat sink comprises a first metallic material and surrounds a first side of the tip portion that faces the return pole. The first heat sink also extends outwards from the tip portion in a cross-track direction. The second heat sink comprises a second metallic material different than the first metallic material. The second heat sink has a first surface thermally coupled to the first heat sink and a second surface thermally coupled to the return pole.

These and other features and aspects of various embodiments may be understood in view of the following detailed discussion and accompanying drawings.

DETAILED DESCRIPTION

Magnetic data storage systems commonly include one or more magnetic recording heads with one or more transducers that respectively write (e.g., a writer) and read (e.g., a reader) information to and from a magnetic storage medium. It is typically desirable to have a relatively small distance or separation between a transducer and its associated media (e.g., 3 nm). However when activated, materials in portions of the one or more magnetic recording heads heat up and expand. The thermal expansion can result in contact with the media. While this is true for magnetic recording in general, heat assisted magnetic recording (HAMR) results in localized protrusion when the heat source, such as a laser diode, is energized. Due to the nature of the highly focused energy delivered to the active region of the magnetic recording head, the near field transducer (NFT) protrudes toward the recording medium. This protrusion renders the magnetic recording head, and specifically the NFT, susceptible to damage due to contact with the recording medium and material on the medium. Also, the localized protrusion area is generally too small to be useful for conventional means of declaring contact. Causing additional regions of the magnetic recording head to thermally expand with the NFT under applied laser power increases the area of a protruded region and corresponding contact area to enable contact detection without damaging the NFT structure.

An example data storage system, a hard disk drive, includes a magnetic recording head arrangement. The magnetic recording head arrangement is located on a slider positioned proximate a rotating magnetic medium. The magnetic medium is configurable for reading and/or writing data with the magnetic recording head arrangement. The surface of the magnetic recording head arrangement facing the magnetic medium includes a head media interface (HMI), which is also referred to as an air bearing surface (ABS).

Proximate the HMI, the magnetic recording head arrangement includes one or more magnetic read heads protected by one or more shields for reading data from the magnetic medium. Also proximate the HMI, the magnetic recording head arrangement includes a write transducer having one or more magnetic write heads for writing data to the magnetic medium. The magnetic write head(s) include a write coil, a main write pole, and a write return pole. A write heater assembly can also be positioned near one of the write poles or between the write poles.

Figure 1:
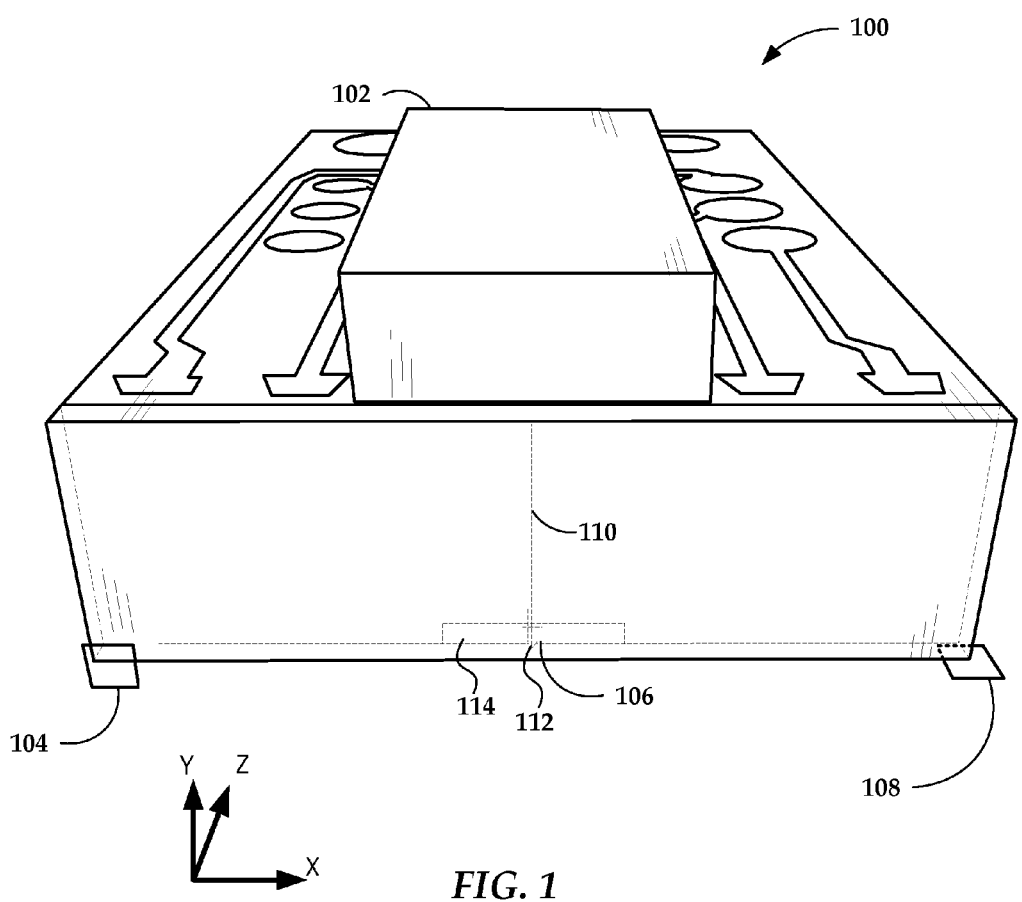
FIG. 1 is a perspective view of a laser arrangement, in accordance with various embodiments.

In some embodiments, the magnetic recording head arrangement is configured for heat assisted magnetic recording (HAMR) by including a laser arrangement 100 shown in FIG. 1. The laser arrangement 100 includes an energy source 102 (e.g., laser diode) configured to produce laser light that energizes an optical antenna 112 of a near field transducer (NFT) 106. The laser light produced by the laser diode is guided to the NFT 106 through an optical waveguide 110 and is focused on the optical antenna 112 by a focusing device such as a tapered optical waveguide or a parabolic mirror. Heat generated by the NFT 106 is dissipated via a heat sink 114. The laser arrangement 100 is also proximate the HMI, which is shown as plane 108 in FIG. 1, and the main write pole (not shown in FIG. 1). The energy source 102 can be mounted external, or integral, to the magnetic recording head arrangement.

The slider, including laser arrangement 100, tracks across the magnetic recording medium in the x-axis of FIG. 1, also referred to as the cross-track direction. Relative to the slider, the magnetic recording medium rotates in the orthogonal z-axis direction, referred to as the downtrack direction. The edge of the slider that first passes over any position of the rotating recording medium in the downtrack direction is referred to as the leading edge, and the edge of the slider that is last to pass over the position of the recording medium is referred to as the trailing edge, designated by plane 104. The magnetic recording head arrangement, with laser arrangement 100, reads and/or writes bits to the rotating magnetic recording medium as the magnetic recording medium rotates relative to the slider.

Figure 2:
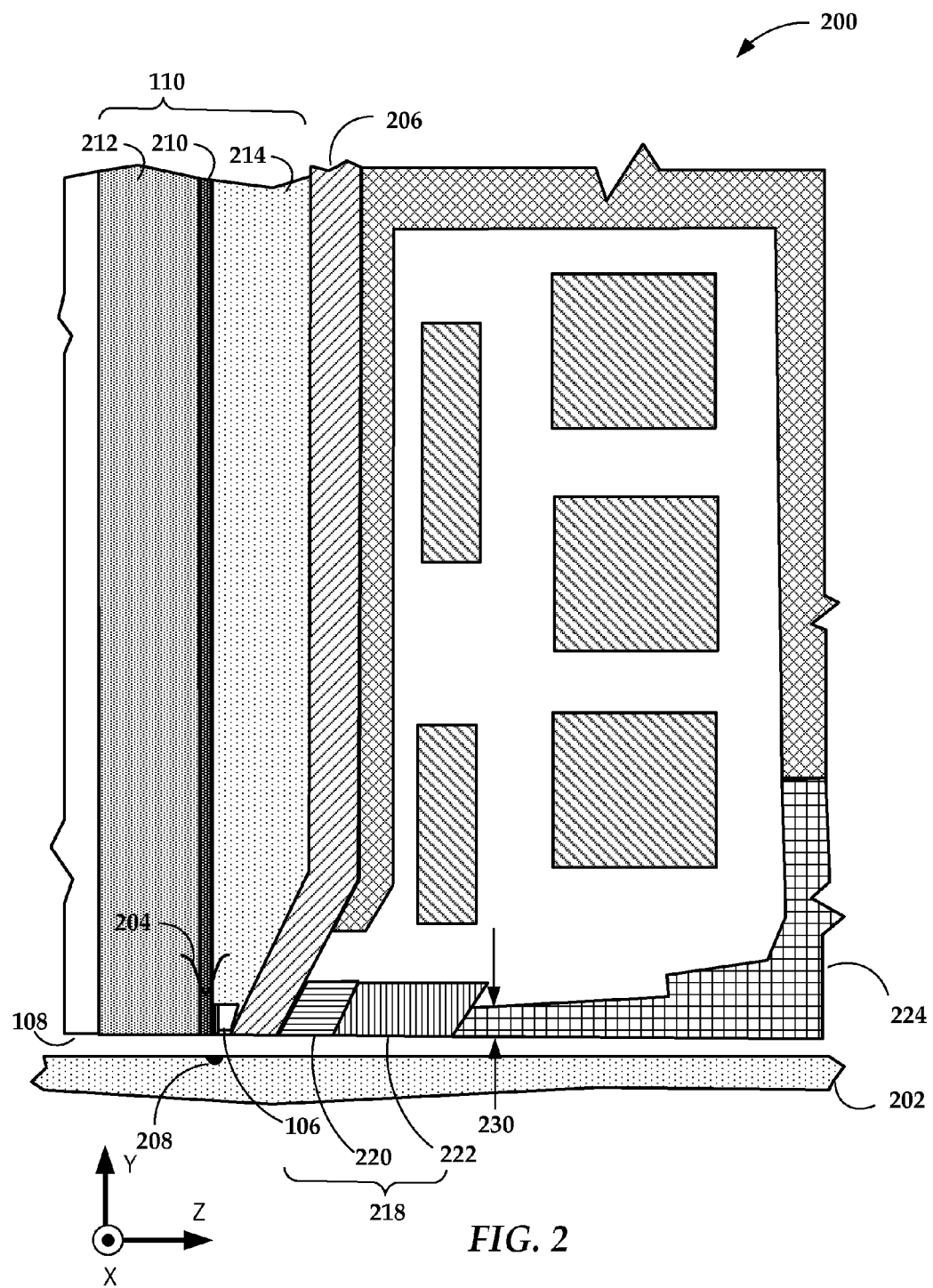
FIG. 2 is a cross-sectional view of a magnetic recording head, in accordance with various embodiments.

A cross-sectional view of a magnetic recording head arrangement 200 including a laser arrangement 100 and a write transducer according to an example embodiment is illustrated in FIG. 2. In this view, the HMI 108 and NFT 106 are proximate to a surface of a magnetic medium 202, e.g., a magnetic disk. The waveguide 110 delivers electromagnetic energy 204 to the NFT 106, which directs the energy to create a small hotspot 208 on the medium 202. The write transducer includes a magnetic write pole 206 having a tip portion proximate the HMI 108 that causes changes in magnetic flux near the HMI 108 in response to an applied current. Flux from the write pole 206 changes a magnetic orientation of the hotspot 208 as the hotspot 208 moves past the write pole 206 in the downtrack direction (z-direction). In addition, the write transducer includes a return pole 224 spaced apart from the write pole 206 in the downtrack direction.

The waveguide 110 and NFT 106 may be formed integrally within a slider that houses the read-write head. These and other optical elements used in HAMR recording heads are generally known as integrated optics devices. Integrated optics devices are components constructed on substrates, sometimes in combination with electronic components. Integrated optics devices may be formed using processes similar to those used for semiconductor production, e.g., deposition of thin films on a substrate.

The waveguide 110, which transfers light from a laser (e.g., laser diode 102 in FIG. 1) to the NFT 106, can be formed by depositing dielectric materials on a substrate using techniques such as atomic layer deposition, photoresist etching, chemical-mechanical planarization, etc. The layers of the waveguide 110 may have differing optical properties, e.g., with middle layer 210 having a refractive index $n_1$, and top and bottom layers 212, 214 having refractive indices $n_2$ and $n_3$. In configurations such as where $n_1 > n_2$, and $n_1 > n_3$, the middle layer 210 acts as a waveguide core and the top and bottom layers 212, 214 act as cladding (similar to cladding over an optic fiber core) so that light propagates efficiently through the waveguide 110 over a particular range of wavelengths.

The NFT 106, write pole 206, return pole 224, and other illustrated components may be formed using similar layer deposition techniques as the waveguide 110, although out of different materials. The write pole 206 may be formed using an iron alloy, and the NFT 106 may be formed from a plasmonic material such as gold or silver. Generally, a plasmonic device such as NFT 106 is used instead of a lens or mirror to focus the energy 204 on to the medium 202 because lenses or mirrors may be diffraction limited at this scale. The NFT 106 is made of a material (e.g., Au, Ag, Cu, Al, etc.) that emits a field of surface plasmons at resonance. The NFT 106 is shaped to direct the plasmon field to the surface of the medium 202.

In this example, the NFT 106 is disposed proximate the waveguide core 210 on or near cladding layer 214, although other orientations may be used. For example, the waveguide core 210 may be terminated behind the NFT 106, e.g., in the positive x-direction. The dimensions and/or location of the waveguide 110 may be adjusted so that the NFT 106 is disposed on or near the core 210 or one of the cladding layers 212, 214. The waveguide 110 may include other features that are not shown in FIG. 2, such as a solid immersion mirror (SIM) or solid immersion lens (SIL) that focuses light on to the NFT 106.

Figure 4:
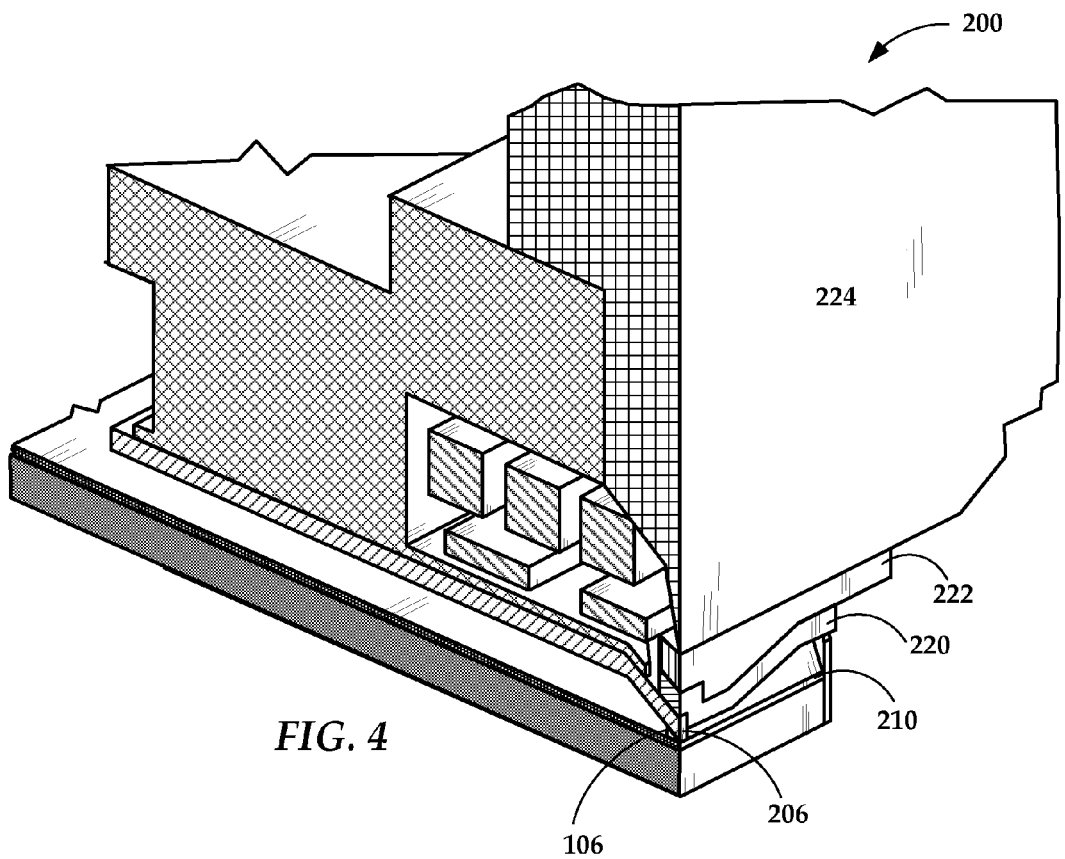
FIG. 4 is a perspective view of the magnetic recording head of FIG. 2, in accordance with various embodiments.

The energy applied to the NFT 106 to create the hotspot 208 can also cause a significant temperature rise in the NFT 106. The NFT 106 may be formed as a peg, pin, bar, or other protrusion having relatively small dimensions in order to keep the generated plasmonic field small. As a result, a heat sink 218 may be formed proximate to (or integral with) the write pole 206. The heat sink 218 may draw heat away from the NFT 106, and be thermally coupled to other components (e.g., the return pole 224) in order to dissipate the heat. The heat sink 218 includes a first heat sink portion 220 surrounding a first side of the tip portion of the write pole 206 that faces the return pole and extends outwards from the tip portion in a cross-track direction (x-direction). The heat sink 218 also includes a second heat sink portion 222 having a first surface proximate the first heat sink portion 220 and a second surface proximate the return pole 224. The second heat sink portion 222 extends outwards in the cross-track direction further than the first heat sink portion. The NFT 106 can be located proximate a second side of the tip portion of the write pole 206 that faces away from the return pole, as illustrated in FIG. 2. A perspective view of the magnetic recording head arrangement 200 is shown in FIG. 4.

Figure 3:
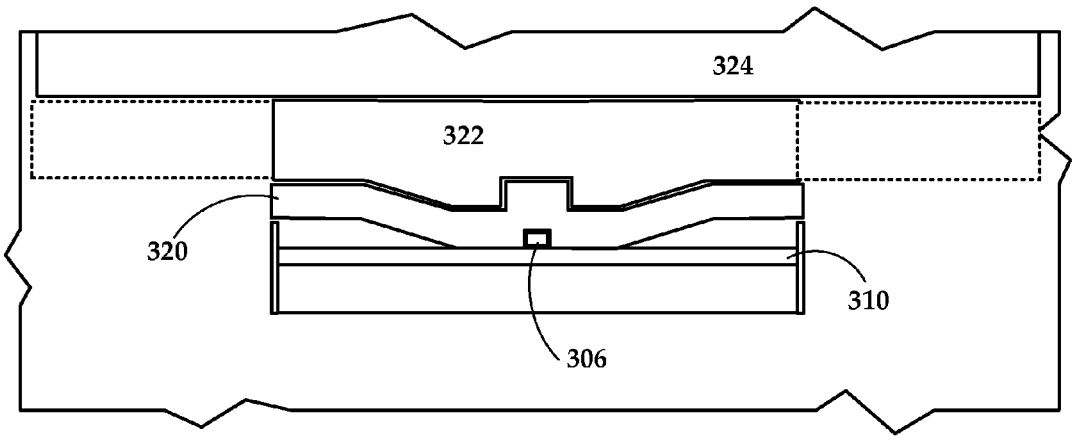
FIG. 3 is a plan view of a magnetic recording head, in accordance with various embodiments.

FIG. 3 is a plan view of a write transducer of a magnetic recording head according to embodiments of the present disclosure. Similar to the write transducer of FIG. 2, a write pole 306 is located proximate a waveguide 310 for a heat source (e.g., a laser diode). A first heat sink 320 surrounds the write pole 306 except for the surface of the write pole 306 located proximate the waveguide 310. A second heat sink 322 is located between the first heat sink 320 and a return pole 324. The second heat sink 322 can optionally extend further in the cross-track direction than the first heat sink (shown with dashed lines in FIG. 3). The return pole 324 and/or one or both of the heat sinks 320, 322 can comprise the HMI contact point. Placing any combination of the first heat sink 320, second heat sink 322, and return pole 324 in direct contact with a contact pad of the HMI assists in heat dissipation and improves the contact close to the heat sink.

Provided that the combined first and second heat sink 320, 322 thickness is greater than 200 nm and the contact throat is less than 300 nm, the potential flux loss and the loss at the transition location are not significant. The contact throat is the depth of the return pole layer from the HMI into the magnetic recording head at the junction with the heat sink (e.g., contact throat dimension 230 in FIG. 2). The contact throat can be narrowly designed by lithographically defining a cove, for example, narrowing the contact throat as described above along the centerline of the NFT projected downtrack through the return pole 224 but allowing the contact throat to be broader in either cross-track direction. Combining the plurality of heat sinks with different write pole geometric configurations can further increase the head field to offset any losses in potential flux. Increasing the head field enables a write transducer to reach saturation with lower applied MMF (magneto-motive force) thereby reducing coil turns and/or applied writer current.

In additional embodiments, the first and second heat sinks comprise differing materials, e.g., a bilayer stack. The first heat sink 320 can comprise a first metallic material, such as Cr, W, Ti, Ta, NiCu, NiCr, NiP; and the second heat sink 322 can comprise a second metallic material, such as 21% NiFe, NiP, NiCu, CoNiFe. The first and second metallic materials in a single embodiment differ from each other. For example, the first metallic material comprises a refractory material, and the second metallic material has a higher coefficient of thermal expansion than the first metallic material. The higher coefficient of thermal expansion can be the result of bilayer plating or a sputtering seed layer. The choice of materials is not limited to soft magnetic layers. The bilayer stack can be created by deposition during the heat sink production process or during the manufacture of the return pole/contact pad region. In certain embodiments, the second heat sink 322 has a first surface thermally coupled to the first heat sink and a second surface thermally coupled to the return pole.

Figure 5:
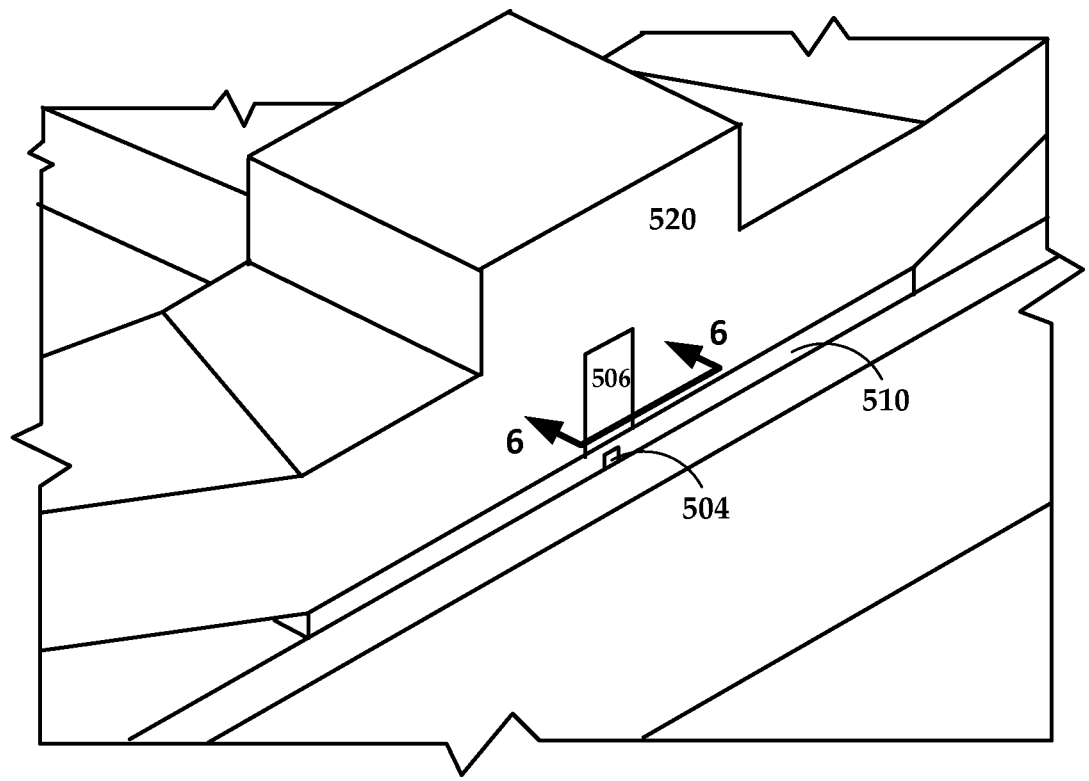
FIG. 5 is an isometric view of a magnetic recording head, in accordance with various embodiments.

FIG. 5 provides an enlarged isometric view of a write transducer according to certain embodiments. Write pole 506 is located proximate waveguide 510. A heat sink 520 surrounds write pole 506 except on the surface proximate the waveguide 510. While only one heat sink 520 is shown, a second heat sink may be included, as discussed above. NFT 504 is encompassed by waveguide 510. Various embodiments are directed to differing geometric configurations of write pole 506. Example configurations are illustrated in FIGS. 6-10, which are each a cross-sectional view taken along the line 6-6 of FIG. 5.

Write pole 506 includes at least one of a taper and a flare coupled to the tip portion 508 of the pole (i.e., portion of the write pole 506 proximate the HMI). The point at which the write pole 506 expands in the cross- and downtrack directions is the break point 509. Different geometric configurations of write pole 506 involve altering the distance of the break point from the HMI, as well as varying the shape and intercept angle of the expanded portion.

Figure 6:
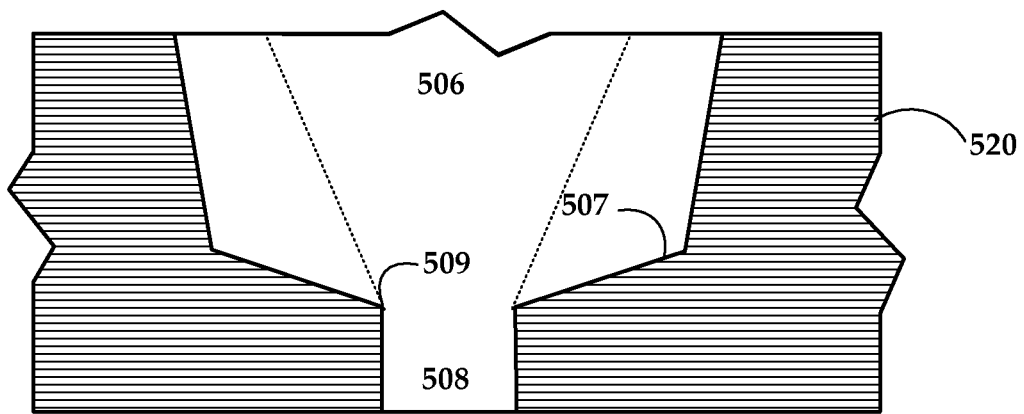
FIGS. 6-10 are cross-sectional views taken along the line 6-6 of FIG. 5, in accordance with various embodiments.

Certain embodiments of a write pole configuration are illustrated in FIG. 6. Write pole 506 is surrounded by a heat sink 520. Break point 509 is the point at which the write pole 506 expands in the cross- and/or downtrack directions. The expanded portion of write pole 506 is known as a taper or a flare. At the HMI, the write pole 506 can be of uniform cross-section to deliver a consistent field magnitude and angle. However, further into the magnetic head from the HMI the write pole 506 can expand in either the cross-track direction (flare) and/or the up- and downtrack directions (taper). From the break point 509, the write pole 506 expands in the cross- and/or downtrack direction at an angle. A conventional angle of expansion (e.g., geometric configuration) is illustrated with dashed lines in FIG. 6. The configuration of FIG. 6, however, has an increased flare angle 507. For example, flare angle 507 is greater than thirty degrees measured from a line extending from a side of the tip portion through the break point 509, toward the HMI. The increased flare angle increases the mass of thermally expandable material proximate the HMI. The broader writer paddle also allows for reducing the operating temperature of the NFT. In addition to expanding the flare angle, the break point 509 can be moved closer to the HMI surface (e.g., moving the break point 509 to less than 40 nm from the HMI surface). The taper can be a variety of widths and distances from the HMI surface, for example, at least 150 nm wide and at least 10 nm from the media-facing surface. This shortens the tip portion 508 from a conventional configuration and moves thermally expandable material closer to the HMI. These changes in geometric configuration can be achieved using process techniques such as optical proximity compensation coupled with multi-layer resist processes and/or bottom layer antireflection layers used in the definition of the photoresist trench in which the structure is formed.

Figure 7:
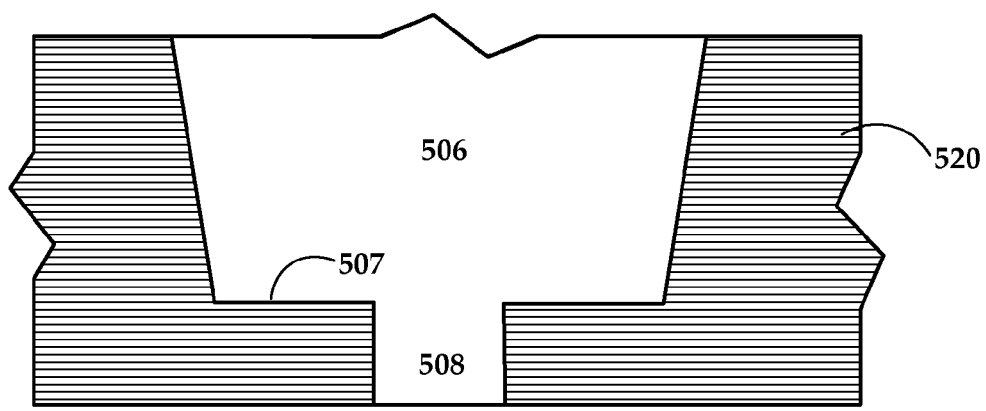

FIG. 7 illustrates embodiments with a flare angle increased beyond that of the embodiments of FIG. 6. Here, the flare angle 507 is substantially parallel with the HMI. The shouldered flare is maintained a short distance (e.g., 10-100 nm) from the HMI to increase the thermally expandable material and increase the contact area of the HMI. Issues such as side track erasure, the overwriting of adjacent tracks by stray magnetic fields, or adjacent track interference in conventional magnetic recording are not impediments in HAMR.

Figure 8:
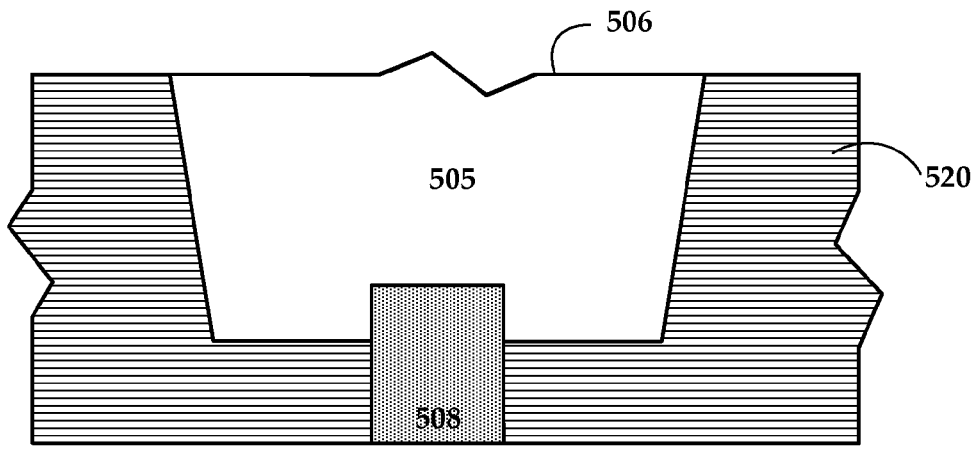
Figure 9:
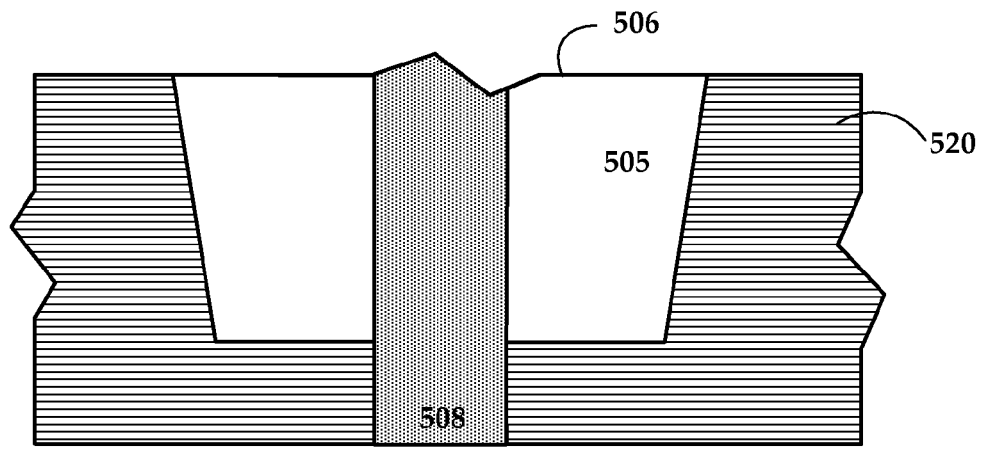

Further embodiments involve a plurality of materials for the write pole 506, as illustrated in FIGS. 8 and 9. A different material can be used for the write pole tip portion 508 than the remainder of the write pole 505 located further away from the HMI surface. While a variety of materials may be selected, they can differ in coefficients of thermal expansion and magnetic moments. For example, the material of the tip portion 508 is selected from a group of materials having a higher magnetic moment than the group of materials from which the material for the remaining, flared portion of the write pole 505 is selected. Similar to FIG. 7, FIGS. 8 and 9 are shown with a substantially parallel flare angle. However, the flare angle can vary as discussed in connection with the embodiments of FIG. 6. In FIG. 8, the first material, e.g., having a higher magnetic moment, is used for the tip portion 508 and extends a short distance past the break point. The remaining portion of the write pole 505 comprises a second material, e.g., having a lower magnetic moment. Alternatively, in FIG. 9, the first material used for the tip portion 508 is extended past the break point and maintained as the central core of the write pole 506. The second material surrounds the core first material beginning at the break point. In addition to altering the geometry of the write pole 506, the geometry of the heat sink can be varied.

Figure 10:
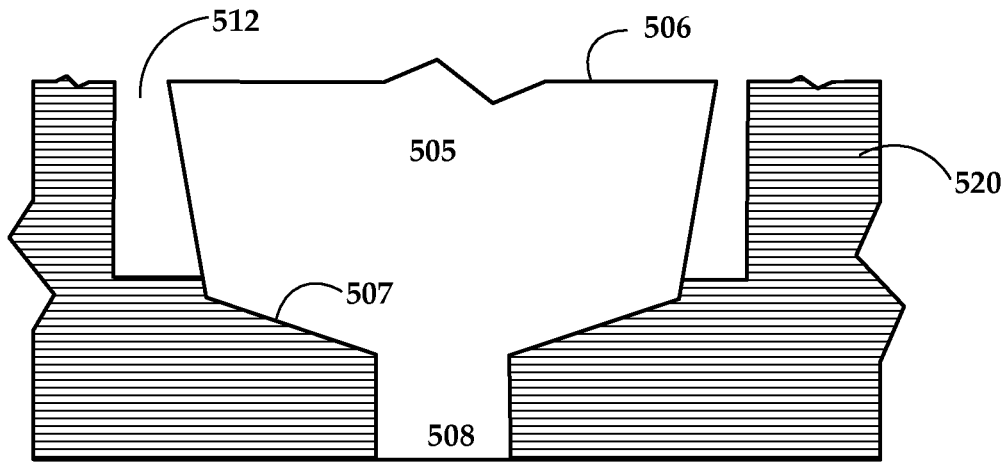

FIG. 10 illustrates embodiments with altered geometries of both the write pole 506 and the heat sink 520. The write pole 506 has an increased flare angle 507, which could be increased further to be substantially parallel with the HMI. The improved thermal expansion of the HMI resulting from the increased write pole flare angle 507 can be further enhanced by modifying the heat sink 520. Instead of encapsulating the write pole 506 within heat sink 520, heat sink 520 is narrowed around the flare portion 507 of the write pole 506. The reduced cross section of the heat sink 520 leaves a gap region 512 around the flare portion 507. The heat sink is then broadened to encapsulate the tip portion 508 of the write pole 506. The reduced cross section of the heat sink 520 proximate the tip portion 508 increases a thermally-induced protrusion of the tip portion 508 that shelters the NFT from damage. As discussed above, the portion of the heat sink between the HMI and the gap region 512 may be of a different material, or the same material, as the portion of the heat sink surrounding the gap portion 512. Variations in geometries for both the heat sink 520 and the write pole 506 increase the displacement of the write pole region with laser activation. The increased protrusion area thus shelters the NFT at the HMI.

Figure 11:
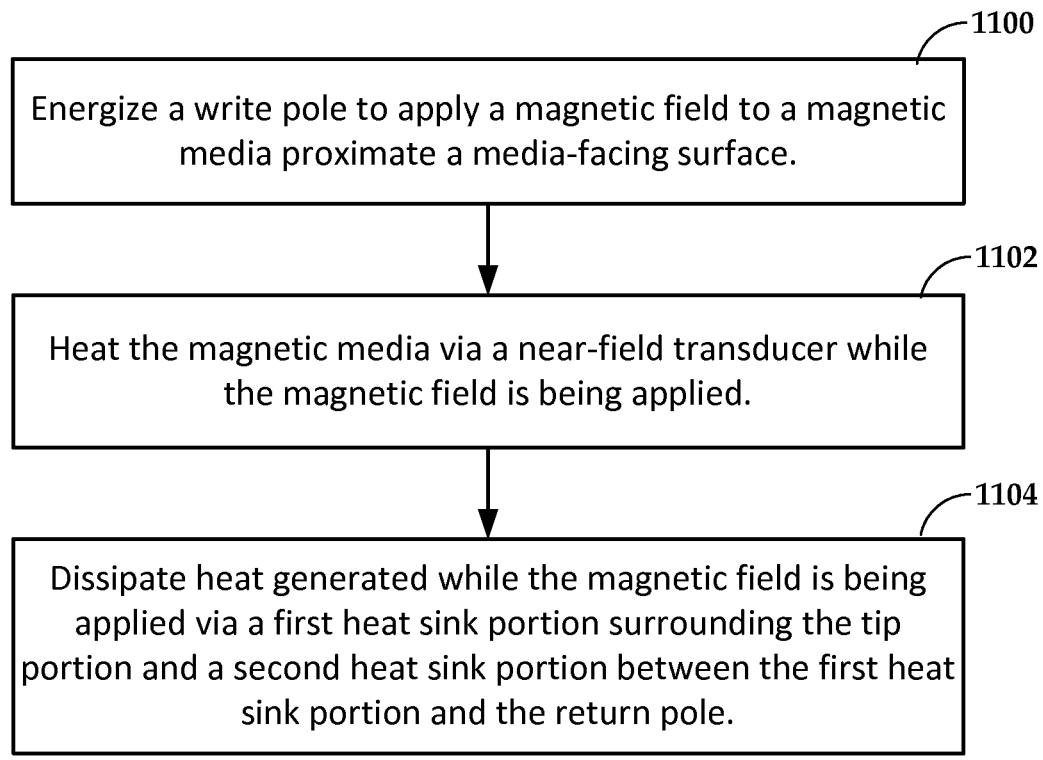
FIG. 11 is a flowchart of a method, in accordance with various embodiments.

FIG. 11 is a flowchart illustrating a method according to an example embodiment. The method involves energizing 1100 a write pole having a tip portion proximate a media-facing surface and a return pole spaced apart from the write pole in a downtrack direction. The write pole applies a magnetic field to a magnetic media proximate the media-facing surface. The magnetic media is heated 1102 via a near-field transducer while the magnetic field is being applied. Heat generated while the magnetic field is being applied is dissipated 1104 via a first heat sink portion surrounding the tip portion and a second heat sink portion between the first heat sink portion the return pole. The first heat sink portion extends outwards from the tip portion in a cross-track direction, and the second heat sink portion extends outwards in the cross-track direction further than the first heat sink portion.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. An apparatus, comprising:
    a write transducer comprising a write pole having a tip portion proximate a media-facing surface and a return pole spaced apart from the write pole in a downtrack direction;

a near-field transducer proximate the write transducer;

a first heat sink portion surrounding a first side of the tip portion that faces the return pole, the first heat sink portion extending outwards from the tip portion in a cross-track direction; and a second heat sink portion comprising a first surface proximate the first heat sink portion and a second surface proximate the return pole, the second heat sink portion extending outwards in the cross-track direction further than the first heat sink portion.

2. The apparatus of claim 1, wherein the near-field transducer is proximate a second side of the tip portion that faces away from the return pole.

3. The apparatus of claim 2, wherein the write pole comprises at least one of a taper and a flare coupled to the tip portion, the at least one of the taper and the flare increasing a mass of thermally expansive material proximate the media-facing surface.

4. The apparatus of claim 3, wherein the taper is at least 100 nm wide and located at least 10 nm from the media-facing surface.

5. The apparatus of claim 3, wherein the taper comprises a magnetic material that has a lower magnetic moment than a material of the tip portion.

6. The apparatus of claim 2, wherein the first heat sink portion has a reduced cross section proximate the tip portion, wherein the reduced cross section increases a thermally-induced protrusion of the tip portion that shelters the near-field transducer.

7. The apparatus of claim 1, wherein the first heat sink portion comprises a first metallic material and the second heat sink portion comprises a second metallic material different than the first metallic material.

8. The apparatus of claim 7, wherein the first metallic material comprises a refractory material, and wherein the second metallic material has a higher coefficient of thermal expansion than the first metallic material.

9. The apparatus of claim 1, wherein a first throat height of the return pole near the second heat sink portion is narrower than a second throat height of the return pole located away from the second heat sink portion in a cross-track direction.

10. An apparatus, comprising:

a write transducer comprising a write pole having a tip portion proximate a media-facing surface and a return pole spaced apart from the write pole in a downtrack direction;

a first heat sink comprising a first metallic material, the first heat sink surrounding a first side of the tip portion that faces the return pole, the first heat sink extending outwards from the tip portion in a cross-track direction; and a second heat sink comprising:
  a second metallic material different than the first metallic material;
  a first surface thermally coupled to the first heat sink; and
  a second surface thermally coupled to the return pole.

11. The apparatus of claim 10, comprising:

a near-field transducer proximate a second side of the tip portion that faces away from the return pole.

12. The apparatus of claim 11, wherein the write pole comprises at least one of a taper and a flare coupled to the tip portion, the at least one of the taper and the flare increasing a mass of thermally expansive material proximate the media-facing surface.

13. The apparatus of claim 12, wherein the taper comprises a magnetic material that has a lower magnetic moment than a material of the tip portion.

14. The apparatus of claim 11, wherein the first heat sink has a reduced cross section proximate the tip portion, wherein the reduced cross section increases a thermally-induced protrusion of the tip portion that shelters the near-field transducer.

15. The apparatus of claim 10, wherein the second heat sink extends outwards in the cross-track direction further than the first heat sink.

16. The apparatus of claim 10, wherein the first metallic material comprises a refractory material, and wherein the second metallic material has a higher coefficient of thermal expansion than the first metallic material.

17. The apparatus of claim 10, wherein the first surface contacts the first heat sink.

18. The apparatus of claim 10, wherein the second surface contacts the return pole.

19. The apparatus of claim 10, wherein a first throat height of the return pole near the second heat sink is narrower than a second throat height of the return pole located away from the second heat sink in a cross-track direction.

20. A method comprising:

energizing a write pole having a tip portion proximate a media-facing surface and a return pole spaced apart from the write pole in a downtrack direction, the write pole applying a magnetic field to a magnetic media proximate the media-facing surface;

heating the magnetic media while the magnetic field is being applied via a near-field transducer; and dissipating heat generated while the magnetic field is being applied via:
  a first heat sink portion surrounding a first side of the tip portion that faces the return pole, the first heat sink portion extending outwards from the tip portion in a cross-track direction; and
  a second heat sink portion between the first heat sink portion and the return pole, the second heat sink portion extending outwards in the cross-track direction further than the first heat sink portion.

* * * * *